INVENTOR
HELMUT HORNUNG
BY Nolte & Nolte
ATTORNEYS

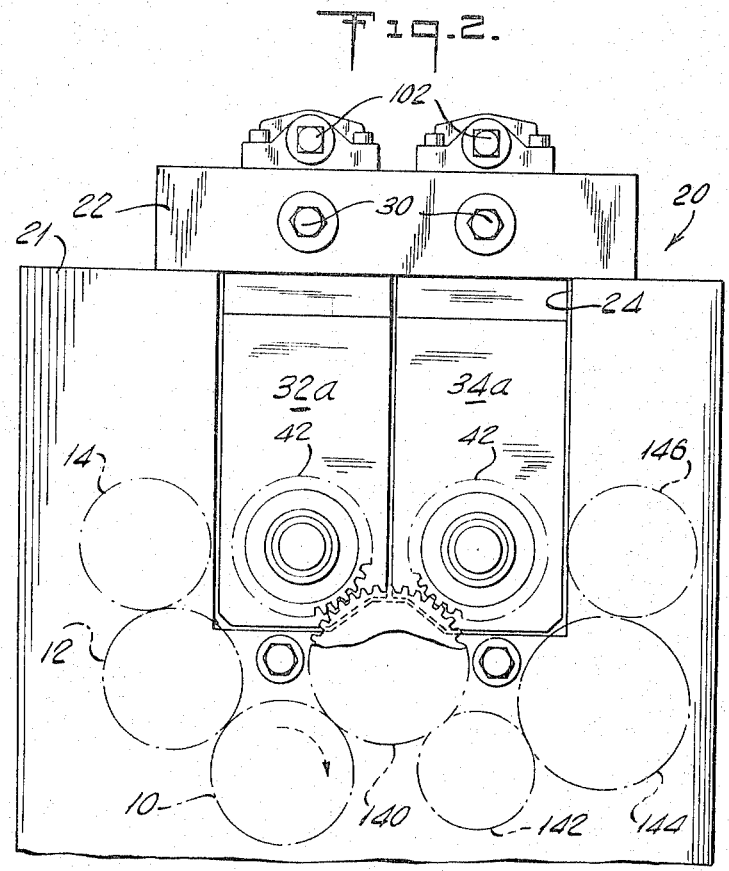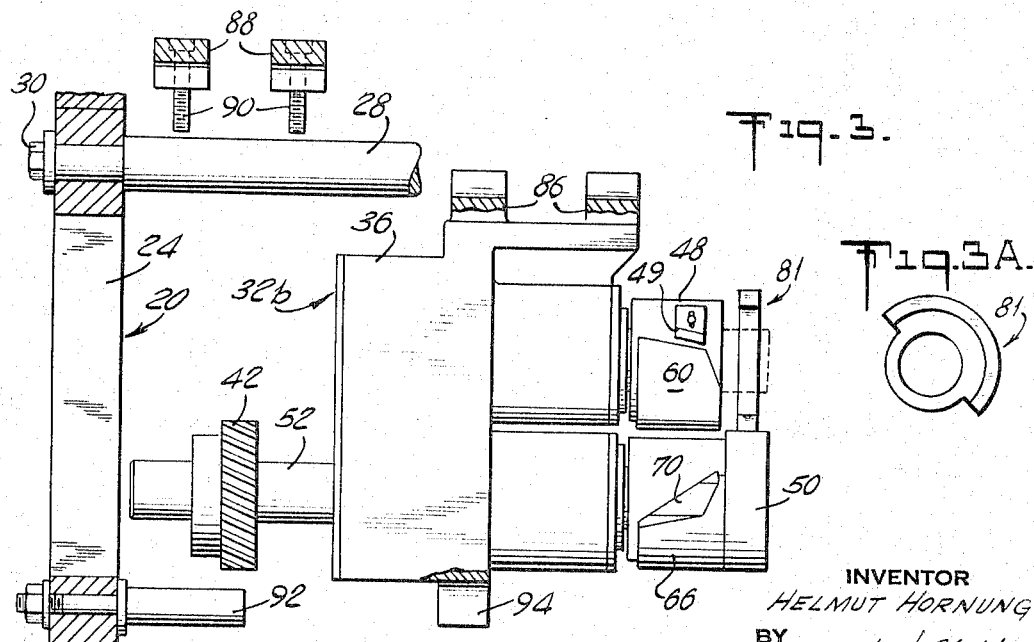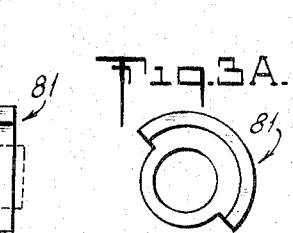

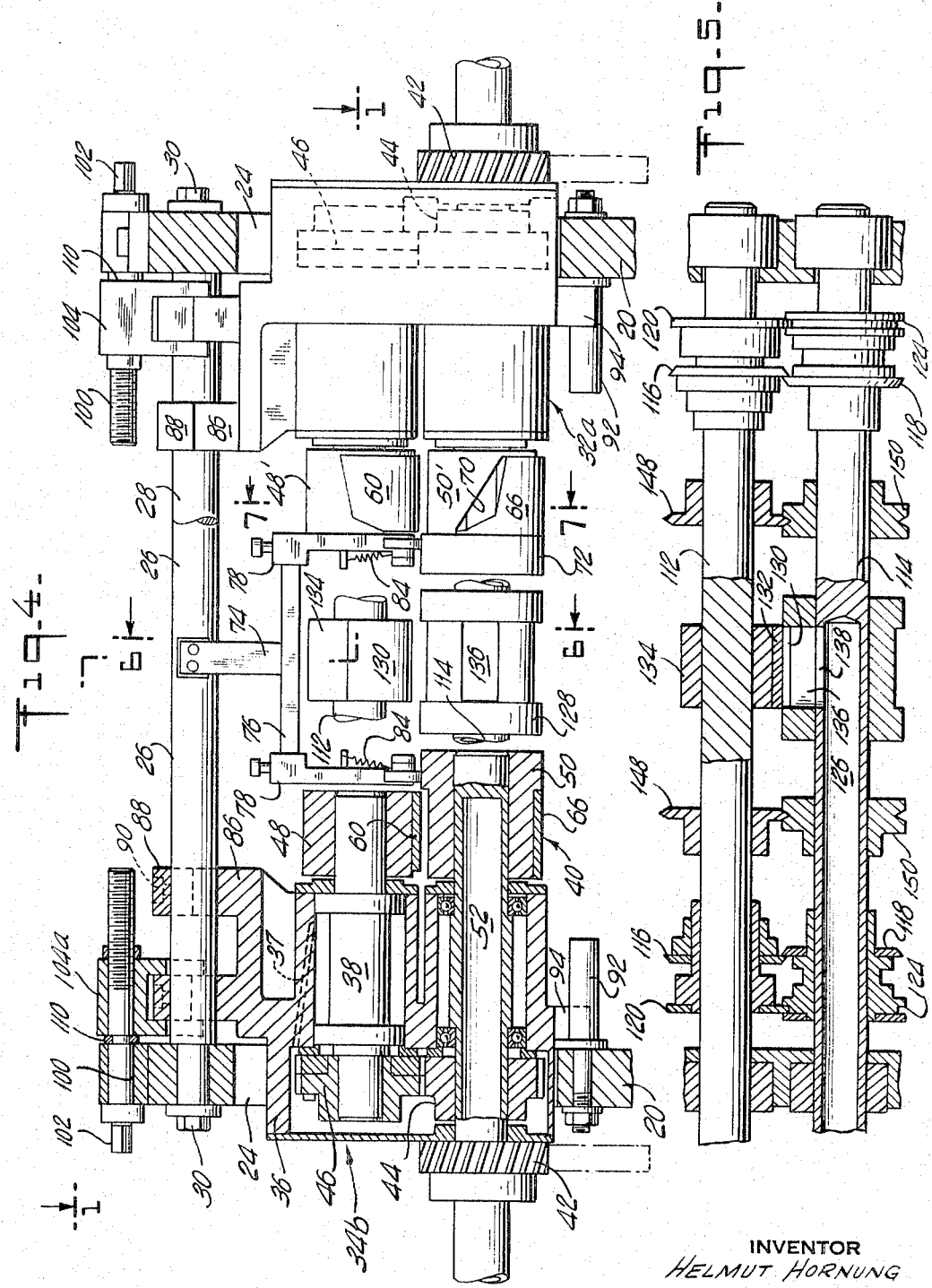

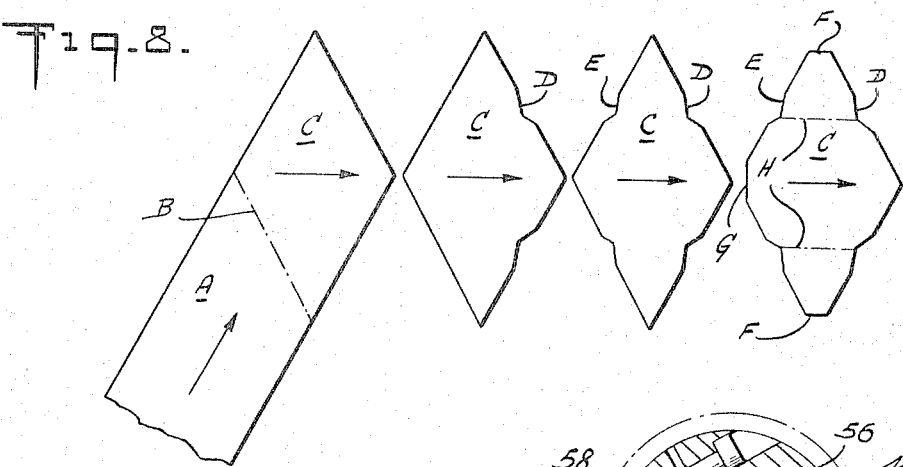
Fig. 8.
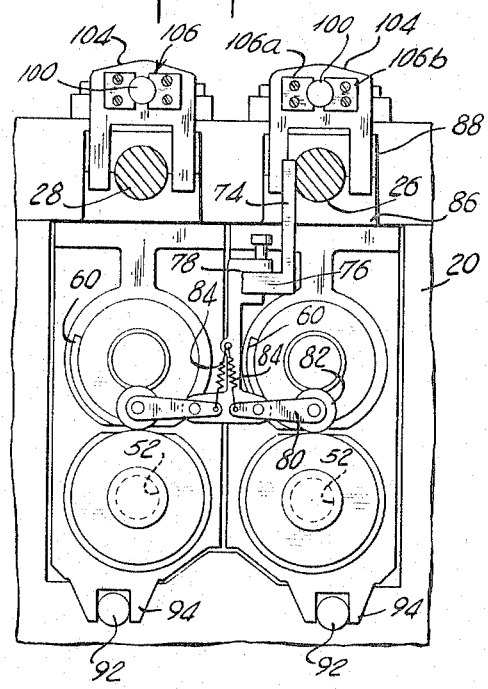
Fig. 6.
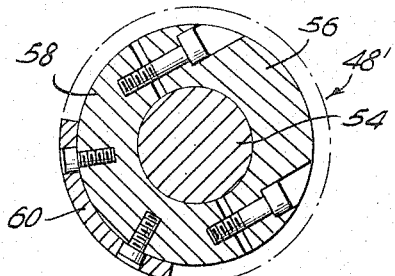
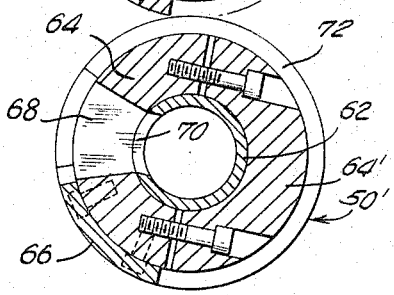
Fig. 7.
INVENTOR
HELMUT HORNUNG
BY
ATTORNEYS United States Patent Office 3,302,503
Patented Feb. 7, 1967

3,302,503
BLANK CUTTING DEVICE
Helmut Hornung, Westchester County, N.Y., assignor to
F. L. Smithe Machine Company, Inc., New York, N.Y.,
a corporation of New York
Filed Nov. 5, 1964, Ser. No. 409,151
12 Claims. (Cl. 83—300)

The present invention relates to adjustable blank cutting devices.

It is known to provide blank cutting devices which are capable of cutting, from a blank which passes through a given machine, portions of the blank so as to provide the blank with a predetermined configuration.

For example, in the manufacture of envelope blanks, it is already known to advance the blanks one after the other through a machine which carries cutters which cut away from edge portions of the blank suitable shaped portions of each blank, as it passes through the machine, so as to provide in this way blanks which have a configuration suitable for forming an envelope.

One of the problems encountered in these machines is the difficulty in making adjustments. Cutters carried by upper and lower shafts have their edges properly matched. However, when one cutter is adjusted along the shaft, it then becomes necessary to adjust the other cutter, and these operations are very time-consuming particularly where angled cutting edges must be rematched.

One of the problems encountered with machines of this type is that the cutters, which cut away portions of the blank, require sharpening from time to time, and when sharpening of the cutters is required it is necessary to stop the operation of the entire machine while the cutters which require sharpening are removed from the machine, sharpened, and then returned to the machine, so that the operations can then continue. Since machines of this type very rapidly manufacture blanks, the termination of the operation of the machine, even for a relatively short period of time, represents a considerable loss because of the unavoidable drop in the output of the machine.

A further difficulty encountered in machines of the above type is that they are especially designed to cut a blank of a given configuration, so that the use of a particular machine for cutting blanks of different configurations is greatly limited.

It is accordingly a primary object of the present invention to provide a blank cutting machine in which cutters can be laterally adjusted without requiring resetting of previously matched and sheared-in cutters.

Another object of the present invention is to provide a blank cutting machine, of the type referred to above, which will be capable of continuing its operations while cutters are being sharpened, and which also is capable of being adjusted so that a wide variety of blank configurations can be provided with the machine of the invention.

In particular, it is an object of the present invention to provide for a machine, which has relatively complex cutting assemblies, a structure which will enable any selected one of the cutting assemblies to be quickly and easily removed when sharpening thereof is required, so that by maintaining on hand a plurality of identical cutting assemblies, any one assembly which has been removed for sharpening can be immediately replaced by an identical assembly so as to enable the operations to continue with an interruption required only to replace one cutting assembly with another.

Bearing in mind that machines of the above type must operate with considerable precision, it is clear that when a cutting assembly is removed it must be replaced with another cutting assembly which will be capable of having its position very precisely determined, and it is therefore a further object of the present invention to provide a structure which, while enabling any selected one of a plurality of cutting assemblies to be quickly and easily removed, nevertheless guarantees that the new cutting assembly, which is used to replace one which has been removed, is assembled with the remainder of the structure in a very precise manner, enabling the operations to continue with the same precision.

In addition, it is an object of the present invention to provide for a structure of the above type a means which will enable the cutting assemblies to be quickly and easily as well as precisely adjusted, so that the particular configuration of the blanks can be varied to a considerable degree.

The structure of the invention includes, in addition to a means for directing blanks one after the other through the machine, a pair of side frames which are respectively formed with openings and a pair of stationary parallel bars which are fixed to and extend across the space between the side frames. A pair of cutting units are situated within each of the openings of the side frames, and these cutting units substantially fill these openings so that they are necessarily located with considerable precision in the machine simply by being placed in the openings. Each cutting unit includes a pair of rotary cutting assemblies and a housing which supports the pair of rotary cutting assemblies and which extends part of the way around one of the bars, while a fastening member extends around the remainder of the bar and is removably fixed to the housing, so that through this simple expedient it is possible by removing a fastening member to place any selected one of the units in a condition for quick and easy removal from the machine, and of course an identical unit can be very quickly placed in the machine to enable the operations thereof to continue. In order to provide very precise locations of the cutting units in the machine an adjusting means is provided, and the adjusting means of the invention includes rotary screw members which cooperate with split nuts capable of being displaced into or out of engagement with the screw members. These split nuts are carried by shifting members which extend part of the way around the above-mentioned fastening members for shifting the latter and the housings of the units therewith, in response to turning of the screw members, along the bars so that in this way the locations of the cutting units can be very precisely determined.

The invention is illustrated by way of example in the accompanying drawings which form part of the application and in which:

FIG. 2 is an end view of the machine of FIG. 1 schematically illustrating the manner in which drives are transmitted to the various rotary components of the machine;

FIG. 3 illustrates how a cutting unit is removed from the machine;

FIG. 3A shows one form of blank transporting roll used with the structure of FIG. 3;

FIG. 4 is a partly sectional fragmentary elevation of the machine of FIG. 1 taken along line 4—4 of FIG. 1 in the direction of the arrows;

FIG. 5 is a fragmentary sectional elevation of structure situated at the rear portion of the machine, FIG. 5 being taken along line 5—5 of FIG. 1 in the direction of the arrows;

FIG. 6 is a partly sectional transverse elevation taken along the line 6—6 of FIG. 4 in the direction of the arrows;

Figure 1:
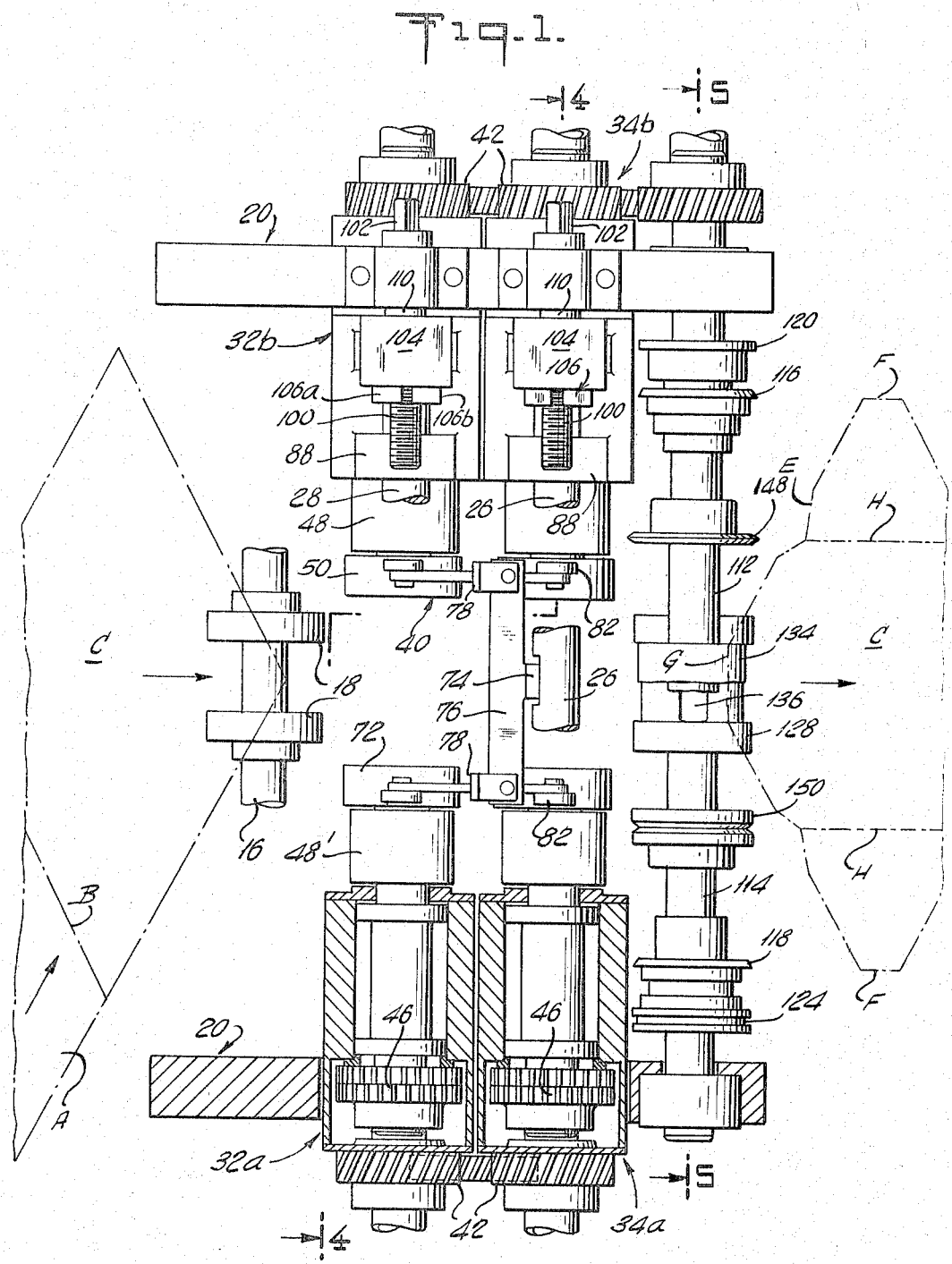
FIG. 1 is a partly sectional plan view fragmentarily illustrating a machine according to the present invention, the section of FIG. 1 being taken along line 1—1 of FIG. 4 in the direction of the arrows.

FIG. 7 shows in a transverse sectional view, on an enlarged scale as compared to FIG. 4, the details of a pair of rotary cutters which cooperate together to cut away a portion of a blank, the section of FIG. 7 being taken along line 7—7 of FIG. 4 in the direction of the arrows; and FIG. 8 diagrammatically illustrates the manner in which the blanks are treated as they progress through the machine of the invention.

The operations performed by the machine can be understood best by referring to FIG. 8. As may be seen from FIG. 8, an elongated sheet A made of paper, for example, is fed from any suitable supply roll or the like in the direction of the arrow shown in FIG. 8, and this sheet is cut at selected intervals along the line B, so as to form in this way a plurality of diamond-shaped blanks C which progress from left to right, as viewed in FIG. 8, through the machine. The diamond-shaped blank C is first formed with the notches D as a result of cutting away a pair of edge portions of the blank, and then opposed edge portions of the blank are cut away so as to form the notches E. Thereafter one end and a pair of side portions of the blank are cut way to form the blank with the edges G and F, indicated at the right in FIG. 8, and this is the final configuration of the blank. The machine of the invention includes cutting means which cut the notches D and E and which cut away end portions of the blank to provide it with the edges F and G.

As is shown diagrammatically in FIG. 2, a rotary gear 10 is supported in any suitable way for rotation and is driven by any suitable motor in a clockwise direction, and this gear 10 meshes with a gear 12, which in turn meshes with a gear 14. The gear 14 is carried by a shaft 16 which is fragmentarily illustrated in FIG. 1, and this shaft 16 carries a pair of feed rollers 18 which cooperate with pressure rollers (not illustrated) located over and engaging the rollers 18, so that in this way the machine is provided with a means for directing the blanks one after the other through the machine from left to right, as viewed in FIG. 1.

The machine includes a support means formed by a pair of stationary side frame members 20, one of which is shown most clearly in FIG. 2, and these side frame members 20 include wall portions 21 which are fixed with upper cross bars 22 which close openings 24 formed in each of the wall portions 21 of the side frame members. The pair of openings 24 in the side frame members 20 are visible in FIG. 4. A stationary bar 26 extends between and is fixed to the side frame members, and in front of the bar 26 is located a second stationary rigid bar 28 which is also fixed to the side frame members to form therewith part of the support means, and this bar 28 is parallel to the bar 26. The bars 26 and 28 have reduced ends which extend into openings of the upper bar 22 of the side frame members, and screw members 30 are threaded into these reduced end portions of the bars 26 and 28 so as to rigidly fix the latter with the side frame members 20 to form a rigid supporting structure therewith.

In the openings 24 of the side frame members are situated a plurality of cutting units, and it will be seen from FIG. 1 that cutting units 32a and 34a are situated in the opening 24 at one side of the support means while the cutting units 32b and 34b are situated in the opening 24 at the other side of the support means. Inasmuch as the structures of the cutting units are substantially the same, reference may be had to FIG. 4 which shows the details of the structure of the cutting unit 34b, and all of the remaining cutting units are similarly constructed.

Each of the cutting units has a housing 36 in which are situated a pair of rotary cutting assemblies 38 and 40 which cooperate together, in a manner described in greater detail below, to cut away selected edge portions of the blanks as they pass through the machine. The lower rotary cutting unit 40 fixedly carries a gear 42 which is connected into the transmission shown diagrammatically in FIG. 2, so that in this way the drive is transmitted to the cutting units. Within the housing 36 the lower rotary cutting unit 40 fixedly carries a gear 44 which meshes with a gear 46, so in this way the upper rotary unit 38 is driven in the direction opposite to that in which the cutting assembly 40 rotates. The rotary cutting assembly 38 of course is provided with a rotary shaft carrying not only the gear 46 but also the cutting structure 48, and the lower rotary cutting assembly 40 fixedly carries a cutting structure 50 which cooperates with the cutting structure 48. The rotary shaft 52 of the lower rotary cutting unit 40 is hollow so that it may be connected with a suitable source of suction for drawing away the portions of the blank which are cut by the cutting unit.

The pairs of rotary cutting structures 48 and 50 of the several units are substantially identical, the only difference being that they are oriented with respect to each other in different ways so as to provide the notches D and E, referred to above, and it is therefore necessary to refer to only one of the pairs of cooperating cutting structures, such as those of the unit 32a shown in greater detail in FIG. 7. The upper unit 48' cooperates with lower unit 50', and these units respectively correspond to the structures 48 and 50 referred to above. As may be seen from FIG. 7, the shaft 54 of the upper rotary cutting assembly fixedly carries a pair of members 56 and 58 which are fastened to each other in any suitable way, and the member 58 fixedly carries the cutter 60 which can be removed for sharpening by removal of the screws illustrated in FIG. 7. The lower hollow shaft 62, which corresponds to the shaft 52, fixedly carries the members 64 and 64' which are fastened to each other in any suitable way as by the screws illustrated, and the member 64 removably carries a cutter 66 which cooperates with the cutter 60. The member 64 is formed with an opening 68 communicating with an opening 70 which is formed in the hollow shaft 62, so that suction applied to the interior of this shaft, in a known way, will draw through the openings 68 and 70 and into the hollow shaft the pieces cut from the blank, so that in this way these pieces can be conveniently disposed of. As may be seen from FIG. 4, the cutting edge of the cutter 66 is substantially V-shaped and will receive the correspondingly shaped cutting edge of the cutter 60, so that in this way during passage of the blank through the machine portions thereof will be cut therefrom, and all of the various cutting assemblies are constructed in a similar way so as to form the notches D and E. As is shown in FIG. 3, for the rotary cutting structure 48, the trailing male cutters are provided with resilient strippers 49, respectively. The members 64 and 64' have raised portions which cooperate together to form the endless raised shoulder 72 along which the blank is guided for movement through the machine. The lower rotary cutting structures of the remaining units have similar raised annular portions which are flush with the outer surfaces of the cutters and which engage the blanks at their undersides to support and guide them through the machine.

For this purpose the rear shaft 26 has a front portion which is flat and to which is removably connected a strap 74 (FIG. 4) which has a lower portion 76 to which are removably connected a pair of substantially T-shaped members 78, one of which is shown most clearly in FIG. 6. The lower, cross-bar portion of each member 78 pivotally carries a pair of levers 80, on which rollers 82 are supported for rotation, and spring 84 are connected to the member 78 and to the levers 80 for urging the rollers 82 into engagement with the inner raised end portions 72 of the several lower rotary cutter structures, so that in this way the rollers 82 engage the upper faces of the blank, while their lower faces are engaged by the raised portion 72 in order to advance the blanks successively through the machine.

Instead of the rollers 82 and the assemblies 74, 76, 78, 80 and 84 associated therewith, the shaft of assembly 38 can be extended, as shown in FIG. 3, and carries a roller segment 81 (FIG. 3A) which rotates with rotary cutting assembly 38 to engage the top faces of the blanks and thus participate in the advance thereof.

Each housing 36 has a pair of upwardly directed portions 86 which pass part of the way around the bar 26 or 28 located over the particular housing, and fastening members 88 extend around the remainder of the bars and are fastened by screws 90 to the upwardly directed portions of the housings, so that in this way the housings are removably fixed with and supported by the bars 26 and 28 of the support means of the machine. In addition, the side frame members 20 removably carry inwardly directed studs 92 which are partly surrounded by downwardly extending portions 94 of the housings (FIG. 6), so that in this way also the housings are prevented from turning and are maintained in proper alignment with each other.

In order to precisely adjust the position of each cutting unit, the upper bar portion 22 of each side frame member supports for the rotary movement the screw members 100 (FIG. 4) which can be manually turned through application of any suitable wrench to the non-circular ends 102 of these screw members 100. The elongated rotary screw members 100 respectively pass freely in threaded engagement through openings of four shifting members 104 which respectively extend downwardly part of the way around the shafts 26 and 28 and which also extend partly around the fastening members 88, so that in response to movement of the shifting members along the screw members 100 it is possible to very precisely adjust the several cutting units. For this purpose the several shifting members 104 carry split nuts 106 (FIG. 6) each of which is composed of a pair of sections 106a and 106b which are fastened to the shifting members by screws 108 with a fit which is loose enough to enable the split nut sections 106a and 106b to be moved out of engagement with the threads of the screw 100 or to be tightened in a position engaging these threads, so that upon rotation of the screw members it is possible to longitudinally move the shifting members 104 through the distance which is required to very precisely determine the position of the particular cutting unit. When an adjustment of this type is made for unit 34b, for example, gear 42 has its connection to shaft 52 loosened so that shaft 52 can slip through gear 42 during shifting of the unit, and thereafter gear 42 can again be tightly fixed to shaft 52. The other units are capable of being adjusted in the same way. Between each side frame member 20 and shifting member 104 the rotary screw member 100 carries a removable snap ring 110, so that in this way, while the member 100 can turn, it cannot move axially with respect to the side frame member until the snap ring 110 is removed.

It will be seen, therefore, with the structure as described above it is possible to very precisely determine the location of the several cutting units so that the location of the notches D and E will also be very precisely adjusted.

The rear portions of the side frame members respectively support for rotation the shafts 112 and 114, shown most clearly in FIG. 5, and these shafts carry cooperating rotary cutting members 116 and 118 at each side of the machine so that these members will cut the ends of the blank to form the edges F. Also the shafts carry rings 120, which are fixed with shaft 112 and which extend into grooves 124 on rotary members carried by the shaft 114, so that in this way the end portions of the blanks which are cut away so as to form the edges F will be guided between the cutters and the elements 120 until they are removed from the machine. The lower shaft 114 is formed with a suction opening 126 and carries at its central portion a rotary cutting member 128 carrying a suitable cutter 130 which cooperates with another cutter 132 which is fixedly carried by the rotary member 134 which is fixed to the shaft 112 and aligned with the rotary member 128, these cutters 130 and 132 being angularly oriented with respect to each other in such way that they will co-operate to cut, in a well known manner, from the blank the trailing end thereof so as to provide the blank with the edge G. The member 128 is formed with an opening 136 aligned with an opening 138 which communicates with the bore 126 so that in this way the portions cut away from the trailing ends of the blanks will be sucked out through the bore 126. The shafts 112 and 114 also carry cooperating rotary grooving members 148 and 150 on each side of the machine so that these members will form the grooves H (FIG. 8), thus leaving the blank ready for folding into its finished form.

The drive for the various components is shown diagrammatically in FIG. 2. The rotary gear 10 meshes with a gear 140 which in turn meshes with the gears 42 carried by the lower shafts of each pair of units which are located in side-by-side relation in an opening 24 of a side frame member, and in this way the drive is transmitted to the lower rotary cutting assemblies of the several cutting units. Also the gear 140 drives a gear 142 which through a gear 144 transmits the drive to a gear 146 which is carried by the lower shaft 114 at the rear of the machine, and a pair of gears are respectively carried by the shafts 112 and 114 in order to rotate the shaft 112 from the rotation of shaft 114. With the transmission indicated schematically in FIG. 2 it is possible for all of the components to rotate in proper synchronism with each other so as to provide the blanks which have the configuration illustrated at the right of FIG. 8.

When it is necessary to remove any one of the units whose cutters require sharpening, it is only necessary first to remove the snap ring 110 from the rotary screw member 100 which is operatively connected with the unit, and then the sections of the split nut are loosened so that now the screw 100 can be completely removed from the machine in order to enable the shifting member 104 of the selected unit to be removed therefrom. Then the fastening members 88 are removed and the selected unit, which in the case of FIG. 3 happens to be the unit 32B, can be removed by being displaced toward the center of the machine. Between the guiding studs 92 there is sufficient space for the selected unit to be lowered and removed from the machine. Of course, before these operations take place the suction conduit is disconnected from shaft 52 and the strap 74 is disconnected from the shaft 26 in order to remove the entire assembly of pressure rollers 82 and the structure carrying the same so that these elements do not interfere with the removal of a selected cutting unit as indicated in FIG. 3. Of course, in the case of FIGS. 3 and 3A there are no assemblies of pressure rolls 82 to be removed. With these exceedingly simple operations carried out in the reverse sequence it is possible to immediately replace the removed unit with an identical unit which is kept on hand and which has properly sharpened cutters, so that with the unit replaced in the machine it is possible again to fasten it to the bar of the support means and to place a shifting member in operative relation therewith, so that the operations can be very quickly resumed. Thus, with the structure of the invention there is a minimum interruption in the operations due to changing of the cutters. Furthermore, at any time it is possible for the operator to turn any selected screws 100 in order to guarantee that all the cutters are properly adjusted relative to each other so as to provide blanks of the required configuration.

This latter feature of the unitized corner notching system is extremely important in that side adjustments can be made without stopping to reset the previously matched and sheared-in cutters. Normally, when cutters are carried on common shafts, that is, the two lower cutters on one shaft and two upper cutters on the other, any slight side movement or adjustment would need careful rematching of the cutting edges. With angles involved as in notching blanks this becomes time consuming. Even if cutters were held in place with key-ways this problem still exists. Keys and key-ways would also hamper the forward and reverse timing of individual cutters on common shafts.

The structure of the invention provides individual cutting sections wherein each notching device, with its anti-backlash gear setting and matched cutters, does not interfere with the setting and adjustments of other cutters working on some other area of the blank at the same moment.

The casting which forms the housing 36 is formed with a lubrication bore or oil channel 37 which extends through the housing 36. This channel carries oil, which is slung by gear 46, to the upper outboard bearing. This oiling system eliminates the need for a high oil level within the gear housing.

What is claimed is:

1. In a machine for cutting blanks to a predetermined configuration, means for directing blanks one after the other through the machine, support means, unitary cutting means for cutting the blanks to a predetermined configuration as they are directed through the machine, means including side frame means and a member extending across said side frame means, said side frame means having formed openings for receiving therein said unitary cutting means into operational position of said unitary cutting means, drive means, said cutting means being operatively and removably connected to said drive means, and means removably connecting said cutting means to said member to be carried thereby, whereby when said cutting means requires sharpening, said unitary cutting means may be removed by displacing said unitary cutting means toward the center of said machine and replaced by another cutting means while the first-mentioned cutting means is sharpened.

2. In a machine for cutting blanks to a predetermined configuration, means for directing blanks one after the other through the machine, support means, means including side frame means and a member extending across said side frame means, said side frame means having formed openings therein, drive means, unitary cutting means adapted to be received in operational position in a respective one of said openings in said side frame means for cutting the blanks to a predetermined configuration as they are directed through the machine, said cutting means being operatively and removably connected to said drive means, and means removably and adjustably connecting said cutting means to said member to be carried thereby, whereby the position of said cutting means relative to said member may be adjusted and said cutting means may be removed by displacing said unitary cutting means toward the center of said machine when sharpening of said cutting means is required, so that a second cutting means can replace the first-mentioned cutting means while the latter is being sharpened.

3. In a machine for cutting blanks to a predetermined configuration, means for directing blanks one after the other through the machine, support means including a pair of side frame means and a member extending between said pair of side frame means, said side frame means having formed openings therein, drive means, at least one cutting unit adapted to be received in operational position in a respective one of said openings in said frame for cutting away an edge portion of each blank as it is directed through the machine, said cutting unit including a pair of rotary cutting assemblies which cooperate to cut away an edge portion of each blank as it passes through the machine, said cutting unit being operatively and removably connected to said drive means and means removably connecting said unit to said member to be carried thereby, so that when said rotary cutting assemblies require sharpening the unit can be removed by displacing said cutting unit toward the center of said machine to be replaced by a second unit while the first-mentioned cutting assemblies are sharpened.

4. In a machine as recited in claim 3, said member is a stationary bar and said unit including a housing which extends partly around said bar, said member for removably connecting said unit to said member including a fastening member extending the rest of the way around said bar and removably fixed to said housing.

5. In a machine as recited in claim 4, adjusting means carried by said support means and operatively connected to said fastening member for shifting the latter and said housing therewith along said bar, so as to adjust the position of said unit.

6. In a machine for cutting blanks to a predetermined configuration, means for directing blanks one after the other through the machine, support means including a pair of side frame means and a member extending between said pair of side frame means, said side frame means having formed openings therein, drive means, a plurality of cutting units each including a housing and a pair of rotary cutting assemblies carried by said housing and cooperating with each other to cut away a portion of each blank as it passes through the machine, said or each cutting unit being operatively and removably connected to said drive means, and means removably connecting said units to said member to be supported thereby and for selective removal therefrom by displacing said units toward the center of said machine when any one of said units requires sharpening, so that when one unit is removed it can be replaced by an identical unit to enable the operation of the machine to continue.

7. In a machine for cutting blanks to a predetermined configuration, means for directing blanks one after the other through the machine, a pair of side frame members formed respectively with aligned openings, a pair of parallel bars fixed to and extended between said side frame members, a pair of cutting units situated in each of said openings, drive means, each of said cutting units being operatively and removably connected to said drive means, each of said units including a pair of rotary cutting assemblies and a housing supporting said rotary cutting assemblies, said cutting assemblies of each unit cooperating to cut away an edge portion of a blank as it is directed through the machine, and said housings of said units respectively extending part of the way around said bars, and a plurality of fastening members extending the rest of the way around said bars and removably fixed to said housings, respectively, for removably fastening the latter to said bars to be removably supported thereby, whereby any one of said housings can selectively be removed from the bar which carries the same and out of the opening of the side frame member in which it is situated when sharpening is required by displacing said housing toward the center of said machine, so that during sharpening any selected one of said units can be replaced by another unit to enable the operations of the machine to continue.

8. In a machine as recited in claim 7, said side frame members each carrying rotary screw members respectively aligned with said bars, a plurality of shifting members respectively formed with openings through which said rotary screw members extend, said shifting members extending partly around said fastening members to shift the latter together with said units along said bars, and said shifting members each carrying a split nut capable of being moved into and out of engagement with the screw member passing through said shifting member, so that turning of said screw members will adjust said units along said bars, said split nuts when displaced from said screw members enabling the latter to be removed from said shifting members to enable the latter to be removed from said fastening members, so that upon disconnection of the latter from said housings, any selected one of said units can be removed from the opening of the frame member in which it is situated.

9. In a machine as recited in claim 8, said frame members also carrying stop members which prevent turning of said units and guide the latter for adjustable movement along said bars.

10. In a machine as recited in claim 8, said bars being situated over said units, and said screw members being situated over said bars.

11. A unitary cutting assembly for use with a machine for cutting blanks to a predetermined configuration, said unitary cutting assembly comprising a housing, a pair of rotary cutting means disposed in said housing, said housing including a securing portion adapted to cooperate with a support member of said machine when said assembly is placed in operational position therein for being releasably supported by said support member, said housing being adapted to be received in an opening formed in a side frame of said machine, said unitary assembly being removable out of operational position thereof within said machine by displacing said unitary cutting assembly toward the center of said machine.

12. A unitary cutting assembly as claimed in claim 11, wherein said housing comprises a further portion cooperating with said side frame for preventing turning of said housing with respect to said frame.

References Cited by the Examiner
UNITED STATES PATENTS

| | | | |
|---|---|---|---|
| 1,286,377 | 12/1918 | Malm | 83—345 |
| 1,313,325 | 8/1919 | Nordyke et al. | 83—344 |
| 1,800,444 | 4/1931 | Dustan et al. | 83—481 |
| 1,931,468 | 10/1933 | Bergholtz | 83—345 |
| 1,968,865 | 8/1934 | Yoder | 83—424 |
| 2,020,491 | 11/1935 | Winters | 83—482 |

WILLIAM W. DYER, Jr., *Primary Examiner.*

L. B. TAYLOR, J. MEISTER, *Assistant Examiners.*